US007689565B1

(12) United States Patent
Gandhi et al.

(10) Patent No.: US 7,689,565 B1
(45) Date of Patent: Mar. 30, 2010

(54) METHODS AND APPARATUS FOR SYNCHRONIZING NETWORK MANAGEMENT DATA

(75) Inventors: Rajesh K. Gandhi, Shrewsbury, MA (US); Keith Alan Carson, Jr., Hopkinton, MA (US); Venkata R. Tiruveedi, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 264 days.

(21) Appl. No.: 11/477,026

(22) Filed: Jun. 28, 2006

(51) Int. Cl.
*G06F 17/30* (2006.01)
(52) U.S. Cl. ......................................... 707/10; 707/204
(58) Field of Classification Search ........................ None
See application file for complete search history.

(56) References Cited

U.S. PATENT DOCUMENTS

| | | | | |
|---|---|---|---|---|
| 5,761,500 | A * | 6/1998 | Gallant et al. ................. | 707/10 |
| 6,122,630 | A * | 9/2000 | Strickler et al. ................ | 707/8 |
| 6,502,092 | B1 * | 12/2002 | Ensor ............................ | 707/3 |
| 6,691,166 | B1 * | 2/2004 | Gasior et al. ................ | 709/232 |
| 2002/0095408 | A1 * | 7/2002 | Cheng ........................... | 707/3 |
| 2003/0133452 | A1 * | 7/2003 | Su .............................. | 370/392 |
| 2004/0068501 | A1 * | 4/2004 | McGoveran .................... | 707/8 |
| 2004/0088432 | A1 * | 5/2004 | Hubbard et al. ............. | 709/246 |
| 2005/0165817 | A1 * | 7/2005 | O'Conor ..................... | 707/101 |

OTHER PUBLICATIONS

IBM, John Ganci et al. "WebSphere Commerce V5.4 Catalog Design and Content Management", IBM RedBook (2003) May 14, 2008 <http://www.redbooks.ibm.com/abstracts/SG246855.html>.*
IBM TDB, "Recovery Protocol Using a Common Log" IBM Technical Disclosure Bulletin 24(1982): 6211-6212.*
Gilfillan, Ian. "Referential Integrity in MySQL." Database Journal. Aug. 19, 2003 May 16, 2008 <http://www.databasejournal.com/features/mysql/article.php/10897_2248101_1>.*
Worsley, John and Joshua Drake. Practical PostgreSQL. O'Reilly Media, Inc., 2002. <http://chestofbooks.com/computers/databases/postgresql/practical-postgresql/Inheritance.html>.*
FFE Software, Inc., "Extended Referential Integrity." FirstSQL.com. 1998. May 18, 2008 <http://www.firstsql.com/ixrefer.htm>.*
Sybase, "System Administration Guide (Online Only)." Sybase Technical Library Product Manuals (2003) May 19, 2008 <http://web.archive.org/web/20030422213757/http://manuals.sybase.com/onlinebooks/group-as/asg1250e/sag/@Generic__BookTextView/60150>.*
IBM WebSphere Commerce 5.6.1.4 Help, "Testing the site on a staging server" (2005) http://publib.boulder.ibm.com/infocenter/wchelp/v5r6m1/index.jsp?topic=/com.ibm.commerce.admin.doc/tasks/tsstest.htm.*

* cited by examiner

*Primary Examiner*—Mohammad Ali
*Assistant Examiner*—Syed H Hasan
(74) *Attorney, Agent, or Firm*—Chapin IP Law, LLC

(57) ABSTRACT

A system receives a dataset for storing in a staging database. The dataset contains network management data collected from a managed resource. The system stores the dataset in the staging database, and maintains a changeset identifying changes made to the staging database during the step of storing the dataset. The system synchronizes the staging database and the production database with each other using the changeset.

19 Claims, 11 Drawing Sheets

CHANGESET TABLE 142

CHANGESET RECORD 144-1

CHANGESET RECORD 144-2

CHANGESET RECORD 144-N

TRANSACTION TABLE 146

| TRANSACTION RECORD 148-1 | 152-1 | 154-1 |
| TRANSACTION RECORD 148-2 | 152-2 | 154-2 |
| TRANSACTION RECORD 148-N | 152-N | 154-N |

*FIG. 2*

205 INVOKE TRANSACTION PROCESSING TO BEGIN A TRANSACTION OF TRANSMITTING THE DATASET AT THE STAGING DATABASE

209 IDENTIFY THAT THE DATASET IS COMPRISED OF A PLURALITY OF PARTITIONS

210 FOR EACH PARTITION WITHIN THE PLURALITY OF PARTITIONS, PERFORM THE STEPS OF:
I) INVOKE PARTITION PROCESSING TO BEGIN TRANSMISSION OF THE PARTITION TO THE STAGING DATABASE
II) DETECT AN ERROR ASSOCIATED WITH THE PARTITION PROCESS
III) INVOKE ABORT PARTITION PROCESSING TO TERMINATE THE PARTITION PROCESSING

211 INVOKE ABORT TRANSACTION PROCESSING TO TERMINATE THE TRANSACTION PROCESSING OF RECEIVING THE DATASET AT THE STAGING DATABASE

FIG. 5

```
218 SYNCHRONIZE THE STAGING DATABASE AND THE PRODUCTION DATABASE
WITH EACH OTHER USING THE CHANGE SET

219 IDENTIFY A HIERARCHY AMONG THE PLURALITY OF STAGING TABLES,
    THE HIERARCHY DEFINED BY RELATIONSHIPS BETWEEN MANAGED
    RESOURCES IN A STORAGE AREA NETWORK FROM WHICH THE DATASET
    IS COLLECTED

220 IDENTIFY A PRIMARY KEY IN THE AT LEAST ONE FIRST
        STAGING TABLE WITHIN THE PLURALITY OF STAGING TABLES

221 IDENTIFY THE PRIMARY KEY IN THE AT LEAST ONE FIRST
        STAGING TABLE IS A FOREIGN KEY IN THE AT LEAST ONE SECOND
        STAGING TABLE

222 BASED ON A RELATIONSHIP OF THE PRIMARY KEY AND THE
        FOREIGN KEY, IDENTIFY THAT THE AT LEAST ONE SECOND
        STAGING TABLE MAINTAINS A HIGHER POSITION THAN THE AT
        LEAST ONE FIRST STAGING TABLE WITHIN THE HIERARCHY
        AMONG THE PLURALITY OF STAGING TABLES

223 IDENTIFY A SEQUENTIAL ORDER IN WHICH TO SYNCHRONIZE THE
    DATASET FROM THE STAGING DATABASE TO THE PRODUCTION
    DATABASE BASED ON THE HIERARCHY

224 COPY THE DATASET FROM THE STAGING DATABASE TO THE
    PRODUCTION DATABASE ACCORDING TO THE SEQUENTIAL ORDER
```

*FIG. 7*

224 COPY THE DATASET FROM THE STAGING DATABASE TO THE PRODUCTION DATABASE ACCORDING TO THE SEQUENTIAL ORDER

225 IDENTIFY, IN THE DATASET, A DATA RECORD TO BE DELETED FROM THE SECOND STAGING TABLE IN THE PRODUCTION DATABASE

↓

226 DELETE THE DATA RECORD FROM THE FIRST STAGING TABLE IN THE PRODUCTION DATABASE

↓

227 FOLLOWING THE DELETION OF THE DATA RECORD FROM THE FIRST STAGING TABLE IN THE PRODUCTION DATABASE, DELETE THE DATA RECORD IN THE SECOND STAGING TABLE IN THE PRODUCTION DATABASE

OR

228 IDENTIFY, IN THE DATASET, A DATA RECORD TO BE INSERTED INTO THE FIRST STAGING TABLE IN THE PRODUCTION DATABASE

↓

229 INSERT THE DATA RECORD IN THE SECOND STAGING TABLE IN THE PRODUCTION DATABASE

↓

230 FOLLOWING THE INSERTION OF THE DATA RECORD IN THE SECOND STAGING TABLE IN THE PRODUCTION DATABASE, INSERT THE DATA RECORD IN THE FIRST STAGING TABLE IN THE PRODUCTION DATABASE

*FIG. 8*

```
┌─────────────────────────────────────────────────────────────────────────┐
│ 231 IDENTIFY A HIERARCHY AMONG THE PLURALITY OF STAGING TABLES, THE     │
│ HIERARCHY DEFINED BY RELATIONSHIPS BETWEEN MANAGED RESOURCES IN A       │
│ STORAGE AREA NETWORK FROM WHICH THE DATASET IS COLLECTED                │
│                                                                         │
│    ┌───────────────────────────────────────────────────────────────┐    │
│    │ 232 IDENTIFY A SELF-REFERENCING RELATIONSHIP BETWEEN STAGING  │    │
│    │ TABLES                                                        │    │
│    └───────────────────────────────────────────────────────────────┘    │
│                                    │                                    │
│                                    ▼                                    │
│    ┌───────────────────────────────────────────────────────────────┐    │
│    │ 233 IDENTIFY A PRIMARY KEY IN THE AT LEAST ONE FIRST STAGING  │    │
│    │ TABLE IS A FOREIGN KEY IN THE AT LEAST ONE SECOND STAGING     │    │
│    │ TABLE                                                         │    │
│    └───────────────────────────────────────────────────────────────┘    │
│                                    │                                    │
│                                    ▼                                    │
│    ┌───────────────────────────────────────────────────────────────┐    │
│    │ 234 IDENTIFY A PRIMARY KEY IN THE AT LEAST ONE SECOND STAGING │    │
│    │ TABLE IS A FOREIGN KEY IN THE AT LEAST ONE FIRST STAGING TABLE│    │
│    └───────────────────────────────────────────────────────────────┘    │
└─────────────────────────────────────────────────────────────────────────┘
```

*FIG. 9*

235 COPY THE DATASET FROM THE STAGING DATABASE TO THE PRODUCTION DATABASE ACCORDING TO THE SEQUENTIAL ORDER

236 IDENTIFY, IN THE DATASET, A DATA RECORD TO BE UPDATED IN THE FIRST STAGING TABLE IN THE PRODUCTION DATABASE

237 NULLIFY THE FOREIGN KEY IN THE AT LEAST ONE SECOND STAGING TABLE

238 NULLIFY THE FOREIGN KEY IN THE AT LEAST ONE FIRST STAGING TABLE

239 UPDATE THE DATA RECORD IN THE FIRST STAGING TABLE IN THE PRODUCTION DATABASE

240 FOLLOWING THE UPDATING OF THE DATA RECORD IN THE FIRST STAGING TABLE IN THE PRODUCTION DATABASE, SET THE FOREIGN KEY IN THE AT LEAST ONE SECOND STAGING TABLE TO THE PRIMARY KEY IN THE AT LEAST ONE FIRST STAGING TABLE

241 SET THE FOREIGN KEY IN THE AT LEAST ONE FIRST STAGING TABLE TO A PRIMARY KEY IN THE AT LEAST ONE SECOND STAGING TABLE

*FIG. 10*

242 SYNCHRONIZE THE STAGING DATABASE AND THE PRODUCTION DATABASE WITH EACH OTHER USING THE CHANGE SET

243 INVOKE CHANGESET TABLE PROCESSING THAT IDENTIFIES AT LEAST ONE TRANSACTION STATUS ASSOCIATED WITH AT LEAST ONE TRANSACTION RECORD IN A TRANSACTION TABLE, THE AT LEAST ONE TRANSACTION RECORD ASSOCIATED WITH A DATA RECORD COPIED FROM THE STAGING DATABASE TO THE PRODUCTION DATABASE, THE TRANSACTION STATUS INDICATING THE PROCESS OF STORING THE DATA RECORD IN THE PRODUCTION DATABASE IS IN PROGRESS

244 DELETE AT LEAST ONE CHANGESET RECORD IN A CHANGESET TABLE, THE AT LEAST ONE CHANGESET RECORD ASSOCIATED WITH THE AT LEAST ONE TRANSACTION RECORD HAVING A TRANSACTION STATUS

245 MODIFY THE TRANSACTION STATUS TO INCLUDE AT LEAST ONE OF:
I) A SUCCESS INDICATING A SUCCESSFUL COPYING OF THE DATA RECORD FROM THE STAGING DATABASE TO THE PRODUCTION DATABASE; AND
II) AN ERROR INDICATING AN UNSUCCESSFUL COPYING OF THE DATA RECORD FROM THE STAGING DATABASE TO THE PRODUCTION DATABASE

246 INVOKE TRANSACTION TABLE PROCESSING THAT DELETES THE AT LEAST ONE TRANSACTION RECORD HAVING THE TRANSACTION STATUS

*FIG. 11*

METHODS AND APPARATUS FOR SYNCHRONIZING NETWORK MANAGEMENT DATA

RELATION TO OTHER APPLICATIONS

This application relates to the following applications filed on the same date as the present application:

i) "METHODS AND APPARATUS FOR COLLECTING DATABASE TRANSACTIONS", Filed Jun. 29, 2006, Ser. No. 11/476,521 ii) "METHODS AND APPARATUS FOR DETECTION AND RECOVERY OF DATABASE OUT OF SYNCHRONIZATION CONDITIONS", Filed Jun. 28, 2006 Ser. No. 11/476,380

The teachings and disclosure of the above co-filed applications are each incorporated by reference herein in their entirety

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource (i.e., a managed resource) in the storage area network and apply a management command in order to display corresponding management information.

Enterprise Storage Networks or Storage Area Networks (SANs) are large and complex environments that include various elements such as storage arrays, switches, hosts and databases all inter-networked. These elements may exist in number by the hundreds in large installations of such environments. These elements in turn may consist of several hundred or thousands of manageable elements or managed resources such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on host computer systems in a SAN for the purpose of gathering data about the various managed resources in the SAN. The agents periodically collect network management data on components such as hosts, switches and storage systems that process and persist data, as well as on applications that use persisted information to enable the management of these environments. In other words, agents collect data associated with the managed resources, and that data is inserted into databases for use within Storage Resource Management solutions, such as ECC. ECC identifies the entire process of retrieving the collected data from agents to data persistence as a transaction. Agents collect data periodically, such as nightly, on the resources and engage in a transaction to send the collected data to the ECC repository for access by ECC applications such as console and server processes that allow SAN administrators to manage the SAN.

Typically, in a SAN management application, an agent collects data associated with the managed resources such as data storage systems, hosts, switches and the like. The agent transmits the data to a production database where the data is inserted. As managed object data is inserted into the production database, that data can be displayed on the console for the network manager to view. In some instances, a set of managed object data collected by an agent from a resource such as a Symmetrix disk array system is a very large amount of data to be placed into the production database. In this situation, the agent divides the collected set of data into manageable partitions prior to being transmitted to the production database. The agent then transmits each partition, one by one, to the production database for storage.

SUMMARY

As discussed in the co-pending application Ser. No. 11/476,521 incorporated by reference above entitled "METHODS AND APPARATUS FOR COLLECTING DATABASE TRANSACTIONS", problems can occur when one or more partitions are not successfully inserted into the production database, resulting in partial data being delivered to the console and resulting in the inability to access the production database during updates from agents (i.e., during transaction processing). Use of a staging database as an interim processing step resolves this problem as described in that co-pending and related patent application. A staging database receives each partition serially from the agent, and the data in each partition is inserted into the staging database first, rather than the production database. When all the partitions associated with the very large dataset have been successfully inserted into the staging database, the production database synchronizes with the staging database that is a faster process than transferring partition data directly into the production database as is done in conventional systems. Thus, only the data from complete datasets are copied to the production database for display on the consoles or for access by other SAN management processes. Likewise, by first copying data to the staging database when it is received from agents, the production database can be maintained accessible in a read-only mode so that consoles, server processes and other SAN management processes can still at least view the production database, as opposed to having to take this database offline during transaction processing to avoid inconsistent view of data.

Embodiments disclosed herein operate in conjunction with the staging system described in the above co-pending patent and allow the system to track all changes made to the staging database during transaction processing. By tracking these changes in a changeset, once a transaction has completed and has been committed to the staging database, the system disclosed herein operates to cause all changes to be then reflected or synchronized with the production database.

More specifically, embodiments described herein provide a system that includes a computer system executing a database synchronizing process that is used to synchronize a staging database that has been modified with data collected from an agent operating in a SAN. The database synchronizing process receives a dataset of managed resource data from an agent. The dataset is inserted into a staging database. As each data record from the dataset is inserted into/deleted from/updated in the staging database, a changeset record is inserted into a changeset table. The changeset record includes a transaction identifier, a table name (referencing the table in the staging database in which the data record was inserted), a table record identifier (identifying a specific data record in the table in the staging database), and an action associated with the data record, such as whether the data record was inserted into the table, deleted from the table, or if the data record was updated in the table. For each record in the changeset table, a transaction record is inserted into a transaction table. The transaction table includes a transaction identifier (the same transaction identifier referenced by the changeset table), and a status identifier identifying the status associated with the transaction of copying the data record from the staging database to the production database. The status can include "in progress", "success" or "error". A data record that is in the staging database, but not yet copied over to the production database has a status of "in progress". A data record that has been successfully copied from the staging database to the production database has a status of "success". A data record that has not been successfully copied from the staging database to the production database has a status of "error". As each data record in the production database is synchronized with the staging database, the corresponding record in the changeset table is deleted. A process is run periodically that deletes any records in the transaction table that have a status of "success" or "error" in the transaction table.

Embodiments disclosed include a computer system executing a database synchronizing process. The database synchronizing process receives a dataset for storing in a staging database. The dataset contains network management data collected from a managed resource. The database synchronizing process stores the dataset in the staging database, and maintains a changeset identifying changes made to the staging database during the step of storing the dataset. The database synchronizing process then synchronizes the staging database and the production database with each other using the changeset.

During an example operation of one embodiment, suppose a system, executing the database synchronizing process on a staging database, receives an extra large dataset from a Symmetrix storage system. The extra large dataset has been partitioned into a set of partitions by an agent software process. The partitions are then processed by a store system for transmission to the staging database. The database synchronizing process receives each partition in the set of partitions. The data in each partition is inserted into the staging database. As each data record from the dataset is inserted into a table in the staging database, for example, the Adapter table, a changeset record is inserted into a changeset table. The changeset record includes a transaction identifier, a table name (referencing the Adapter table), a table record identifier (identifying a specific record in the Adapter table), and an action associated with the data record, indicating the data record was inserted into the Adapter table. A corresponding transaction record is inserted into a transaction table. The transaction table includes a transaction identifier (the same transaction identifier referenced by the changeset table), and a status identifier identifying the status associated with the data record (inserted into the Adapter table) as being "in progress". As the synchronizing process completes, the data record in the Adapter table is copied from the staging database to a corresponding Adapter table in the production database, the corresponding record in the changeset table is deleted, and the status in the transaction table is changed from "in progress" to "success". A process is run nightly that deletes the record in the transaction table (associated with the data record inserted into the Adapter table in the production database).

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 2 shows a high-level block diagram of a changeset table and a transaction table according to one embodiment disclosed herein.

FIG. 5 illustrates a flowchart of a procedure performed by the system of FIG. 1 when the database synchronizing process invokes transaction processing to begin a transaction of transmitting the dataset at the staging database, according to one embodiment disclosed herein.

FIG. 7 illustrates a flowchart of a procedure performed by the system of FIG. 1 when the database synchronizing process synchronizes the staging database and the production database with each other using the changeset, according to one embodiment disclosed herein.

FIG. 8 illustrates a flowchart of a procedure performed by the system of FIG. 1 when the database synchronizing process copies the dataset from the staging database to the production database according to the sequential order, according to one embodiment disclosed herein.

FIG. 9 illustrates a flowchart of a procedure performed by the system of FIG. 1 when the database synchronizing process identifies a hierarchy among the plurality of staging tables, the hierarchy defined by relationships between managed resources in a storage area network from which the dataset is collected, according to one embodiment disclosed herein.

FIG. 10 illustrates a flowchart of a procedure performed by the system of FIG. 1 when the database synchronizing process copies the dataset from the staging database to the production database according to the sequential order, according to one embodiment disclosed herein.

FIG. 11 illustrates a flowchart of a procedure performed by the system of FIG. 1 when the database synchronizing process synchronizes the staging database and the production database with each other using the changeset, according to one embodiment disclosed herein.

DETAILED DESCRIPTION

Embodiments disclosed herein include methods and a computer system that perform a database synchronizing process. The database synchronizing process receives a dataset of managed resource events from an agent. The dataset is inserted into a staging database. As each data record from the dataset is inserted into/deleted from/updated in the staging database, a changeset record is inserted into a changeset table. The changeset record includes a transaction identifier, a table name (referencing the table in the staging database in which the data record was inserted), a table record identifier (identifying a specific record in the table in the staging database), and an action associated with the data record, such as whether the data record was inserted into the table, deleted from the table, or if the data record was updated in the table. For each record in the changeset record, a transaction record is inserted into a transaction table. The transaction table includes a transaction identifier (the same transaction identifier referenced by the changeset table), and a status identifier identifying the status associated with the transaction of copying the data record from the staging database to the production database. The status can include "in progress", "success" or "error". A data record that is in the staging database, but not yet copied over to the production database has a status of "in progress". A data record that has been successfully copied from the staging database to the production database has a status of "success". A data record that has not been successfully copied from the staging database to the production database has a status of "error". As each data record in the production database is synchronized with the staging database, the corresponding record in the changeset table is deleted. A process is run periodically that deletes any records in the transaction table that have a status of "success" or "error" in the transaction table.

Embodiments disclosed include a computer system executing a database synchronizing process. The database synchronizing process receives a dataset for storing in a staging database. The dataset contains network management data collected from a managed resource. The database synchronizing process stores the dataset in the staging database, and maintains a changeset identifying changes made to the staging database during the step of storing the dataset. The database synchronizing process then synchronizes the staging database and the production database with each other using the changeset.

Figure 1:
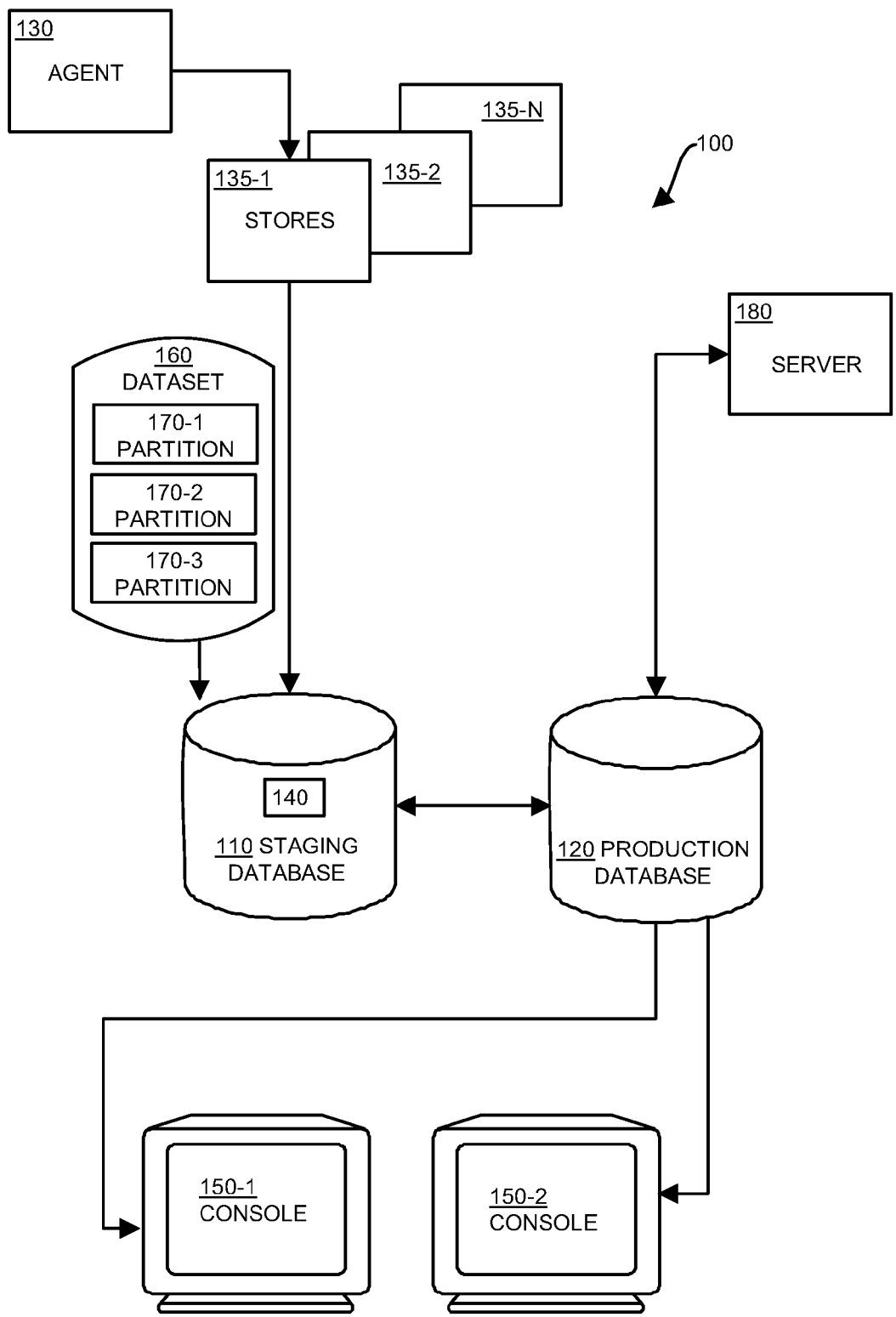
FIG. 1 shows a high-level block diagram of a computer system according to one embodiment disclosed herein.

FIG. 1 is a block diagram illustrating example architecture of a computer networking environment 100 that includes an agent 130, a plurality of stores systems 135-N, a computer system including a staging database 110, and a computer system that includes a production database 120. The staging database 110 is in communication with the production database 120. The production database 120 is in communication with at least one server 160 and at least one console 150-1. The agent receives extra large datasets 160 of managed objects from the agent 130, and partitions each extra large dataset 160 into a plurality of partitions 170-N. The staging database 110 receives the plurality of partitions 170-N. The database synchronizing process 140, operating on the computer system on which the staging database 110 resides, stores the data (contained in the plurality of partitions 170-N) into the staging database 110. The database synchronizing process 140 then synchronizes the data (contained within the staging database 110) with the production database 120 for display on the consoles 150-N.

The database synchronizing process 140 may be embodied as software code such as data and/or logic instructions (e.g., code stored in the memory or on another computer readable medium such as a removable disk) that supports processing functionality according to different embodiments described herein.

It is noted that example configurations disclosed herein include the database synchronizing process 140 itself (i.e., in the form of un-executed or non-performing logic instructions and/or data). The database synchronizing process 140 may be stored as an application on a computer readable medium (such as a floppy disk), hard disk, electronic, magnetic, optical, or other computer readable medium. The database synchronizing process 140 may also be stored in a memory system such as in firmware, read only memory (ROM), or, as in this example, as executable code in, for example, Random Access Memory (RAM). Those skilled in the art will understand that the agent 130, stores 135-N, server 180, production database 120, staging database 110, and consoles 150-N may include other processes and/or software and hardware components, such as an operating system not shown in this example.

FIG. 2 is a block diagram illustrating example architecture of a changeset table 142 and transaction table 146 used to maintain a changeset identifying changes made to the staging database 110 during the storing of the dataset 160 into the staging database 110. The changeset table 142 includes a plurality of changeset records 144-N, and the transaction table 146 includes a plurality of transaction records 148-N. Each transaction record 148-1 contains a transaction identifier 152-1 and a transaction status 154-1.

Further details of configurations explained herein will now be provided with respect to a flow chart of processing steps that show the high level operations disclosed herein to perform the database synchronizing process 140.

Figure 3:
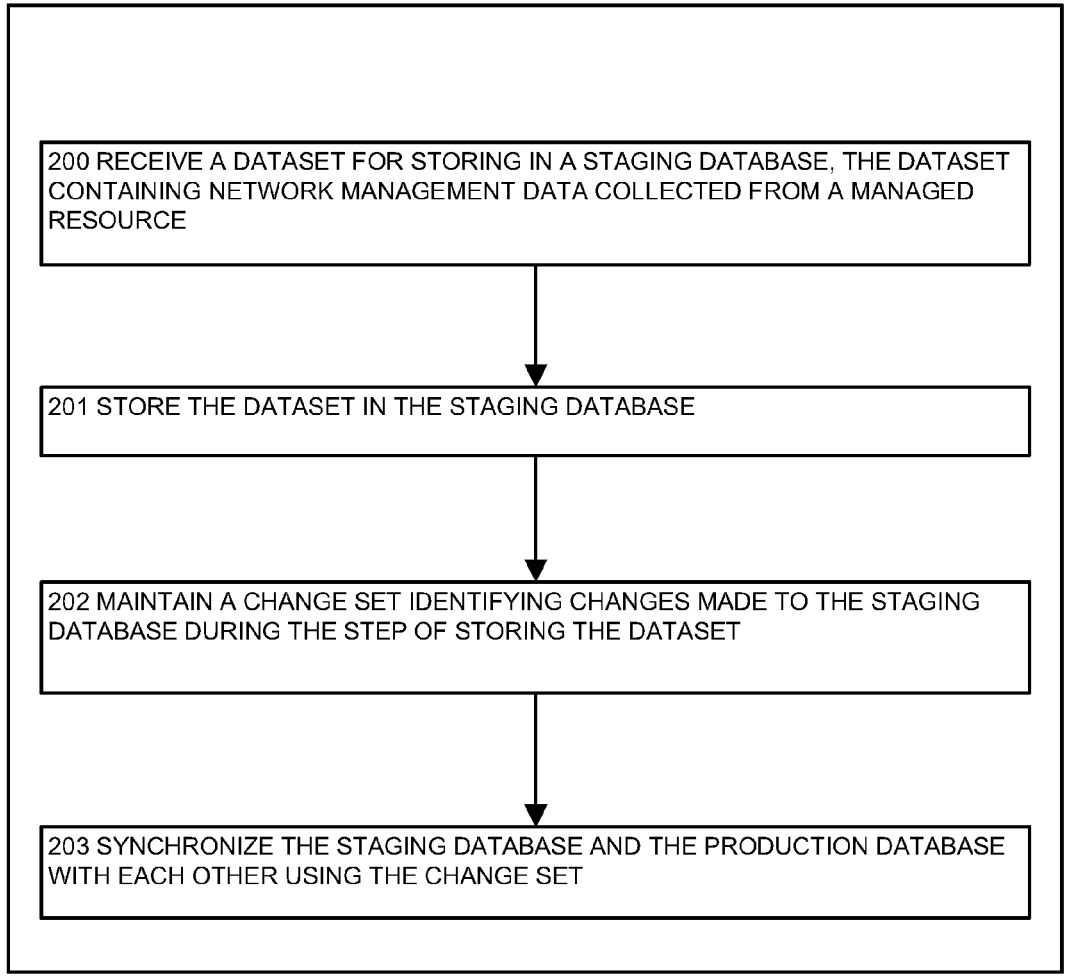
FIG. 3 illustrates a flowchart of a procedure performed by the system of FIG. 1 when the database synchronizing process receives a dataset for storing in a staging database, the dataset containing network management data collected from a managed resource, according to one embodiment disclosed herein.

FIG. 3 is a flowchart of the steps performed by the database synchronizing process 140 when it receives a dataset 160 for storing in a staging database 110, the dataset 160 containing network management data collected from a managed resource.

In step 200, the database synchronizing process 140 receives a dataset 160 for storing in a staging database 110. The dataset 160 contains network management data collected from a managed resource. The dataset 160 is transmitted by the agent 130, and processed by a process on a store system 135-N. In an example embodiment, multiple agents 130-N are transmitting datasets 160-N to the database synchronizing process 140 residing on the staging database 110.

In step 201, the database synchronizing process 140 stores the dataset 160 in the staging database 110. Upon successful receipt of the dataset 160 transmitted from the agent 130, the dataset 160 is stored in the staging database 110.

In step 202, the database synchronizing process 140 maintains a changeset identifying changes made to the staging database 110 during the step of storing the dataset 160. In an example embodiment, the changeset is stored in a changeset table 142 containing changeset records 144-N, and a transaction table 146 maintains changes in the changeset table 142 via a transaction identifier 152-N and a transaction status 154-N.

In step 203, the database synchronizing process 140 synchronizes the staging database 110 and the production database 120 with each other, using the changeset. As the staging database 110 receives new data from the agent 130, the staging database 110 utilizes the changeset table 142 and transaction table 146 to track the new changes in the staging database 110. The staging database 110 then synchronizes with the production database 120. As the production database 120 receives new data from, for example, the server 180, the production database 120 synchronizes with the staging database 110. During the process of storing the data from the dataset 160 in the staging database 110, the production database 120 is locked (from receiving new data).

Figure 4:
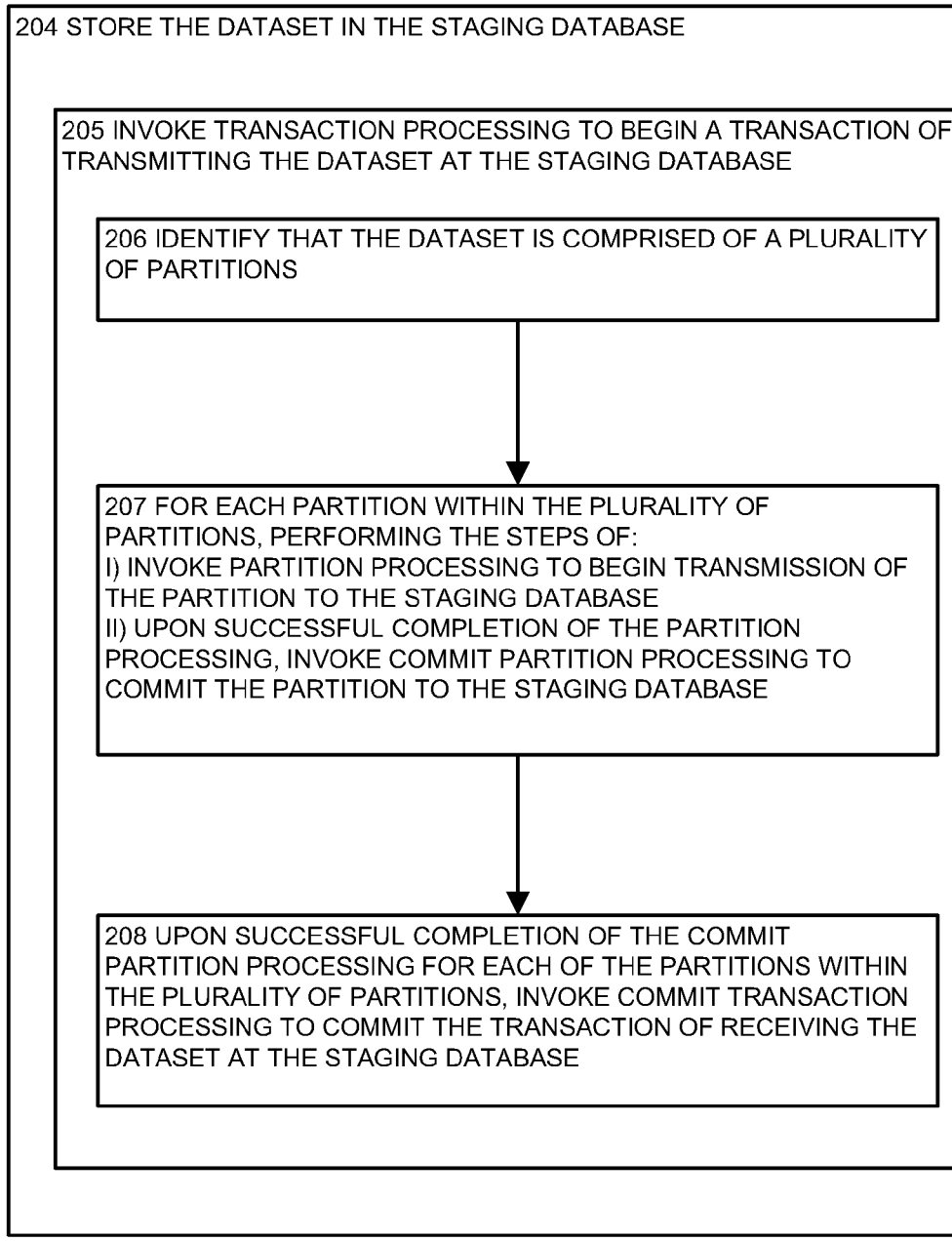
FIG. 4 illustrates a flowchart of a procedure performed by the system of FIG. 1 when the database synchronizing process stores the dataset in the staging database, according to one embodiment disclosed herein.

FIG. 4 is a flowchart of the steps performed by the database synchronizing process 140 when it successfully stores the dataset 160 in the staging database 110.

In step 204, the database synchronizing process 140 stores the dataset 160 in the staging database 110. Upon successful receipt of the dataset 160 transmitted from the agent 130, the dataset 160 is stored in the staging database 110.

In step 205, the database synchronizing process 140 invokes transaction processing to begin a transaction of transmitting the dataset 160 at the staging database 110. In an example embodiment, the transaction processing is a transaction software process that is invoked by the database synchronizing process 140. The transaction processing process handles the transaction of receiving the dataset 160 at the staging database 110. In an example configuration, the transaction processing initializes a staging transaction table within the staging database 110 with parameters passed in via a transaction process function.

In step 206, the database synchronizing process 140 identifies that the dataset 160 is comprised of a plurality of partitions 170-N. In an example embodiment, the dataset 160 is an extra large dataset 160, for example, from a large storage system, such as a Symmetrix. The agent 130 divides the extra large dataset 160 into a plurality of partitions 170-N for transmitting to the staging database 110. The store system 135-1 processes each partition 170-1 in the order in which that partition 170-1 is received from the agent 130, and transmits each partition 170-1 to the database synchronizing process 140. Each partition 170-1 within the plurality of partitions 170-N is treated as a separate database transaction during the storing of the plurality of partitions 170-N (i.e., the dataset 160) in the staging database 110.

In step 207, for each partition 170-1 within the plurality of partitions 170-N, the database synchronizing process 140 performs the steps of:

i) Invoking partition processing to begin transmission of the partition 170-1 to the staging database 110. In an example embodiment, the partition processing is a partition software process that is invoked by the database synchronizing process 140. The partition software process indicates the start of transmitting a partition 170-1 to the staging database 110. Parameters passed into partition processing are used to execute a database procedure that saves a transaction identifier 152-N into a staging session content session table.

ii) Invoking commit partition processing, upon successful completion of the partition processing, to commit the partition 170-1 to the staging database 110. In an example embodiment, the commit partition processing is a commit partition software process that commits the partition 170-1 to the staging database 110.

In step 208, upon successful completion of the commit partition processing for each of the partitions 170-N within the plurality of partitions 170-N, the database synchronizes process 140, invokes commit transaction processing to commit the transaction of receiving the dataset 160 at the staging database 110. In an example embodiment, the commit transaction processing is a commit transaction software process. The commit transaction software process executes a stored procedure that copies staging data associated with a transaction identifier 152-N (that is passed in as a parameter to the commit transaction software process) to the production database 120. Once the data is successfully copied to the production database 120, the commit transaction software process deletes corresponding data in the changeset table 142.

FIG. 5 is a flowchart of the steps performed by the database synchronizing process 140 when it unsuccessfully stores the dataset 160 in the staging database 110.

In step 205, the database synchronizing process 140 invokes transaction processing to begin a transaction of transmitting the dataset 160 at the staging database 110. In an example embodiment, the transaction processing is a transaction software process that is invoked by the database synchronizing process 140. The transaction processing process handles the transaction of receiving the dataset 160 at the staging database 110. In an example configuration, the transaction processing initializes a staging transaction table within the staging database 110 with parameters passed in via a transaction process function.

In step 209, the database synchronizing process 140 identifies that the dataset 160 is comprised of a plurality of partitions 170-N. In an example embodiment, the dataset 160 is an extra large dataset 160, for example, from a large storage system, such as a Symmetrix. The agent 130 divides the extra large dataset 160 into a plurality of partitions 170-N for transmitting to the staging database 110. The store system 135-1 processes each partition 170-1 in the order in which that partition 170-1 is received from the agent 130, and transmits each partition 170-1 to the database synchronizing process 140. Each partition 170-1 within the plurality of partitions 170-N is treated as a separate database transaction during the storing of the plurality of partitions 170-N (i.e., the dataset 160) in the staging database 110.

In step 210, the database synchronizing process 140 for each partition within the plurality of partitions, perform the steps of:

i) Invoking partition processing to begin transmission of the partition 170-1 to the staging database 110. In an example embodiment, the partition processing is a partition software process that is invoked by the database synchronizing process 140. The partition software process indicates the start of transmitting a partition 170-1 to the staging database 110. Parameters passed into partition processing are used to execute a database procedure that saves a transaction identifier 152-N into a staging session content session table.

ii) Detecting an error associated with the partition process. An error can occur during the transmission of the partition to the staging database 110, resulting in a partition 170-1 failing to be received at the staging database 110.

iii) Invoking abort partition processing to terminate the partition processing. In an example embodiment, the abort partition processing is an abort partition software process that terminates the process of transmitting the partition 170-1 from the agent 130 to the staging database 110.

In step 211, the database synchronizing process 140 invokes abort transaction processing to terminate the transaction processing of receiving the dataset 160 at the staging database 110. In an example embodiment, the abort transaction processing is an abort transaction software process. The abort transaction software process executes a stored procedure that refreshes staging database 110 data modified by a transaction identifier 152-1 associated with the transaction. The abort transaction processing then removes data, associated with the aborted transaction, from the changeset table 142 and transaction table 146. In other words, the data in the staging database 110 (associated with the aborted transaction) is rolled back.

Figure 6:
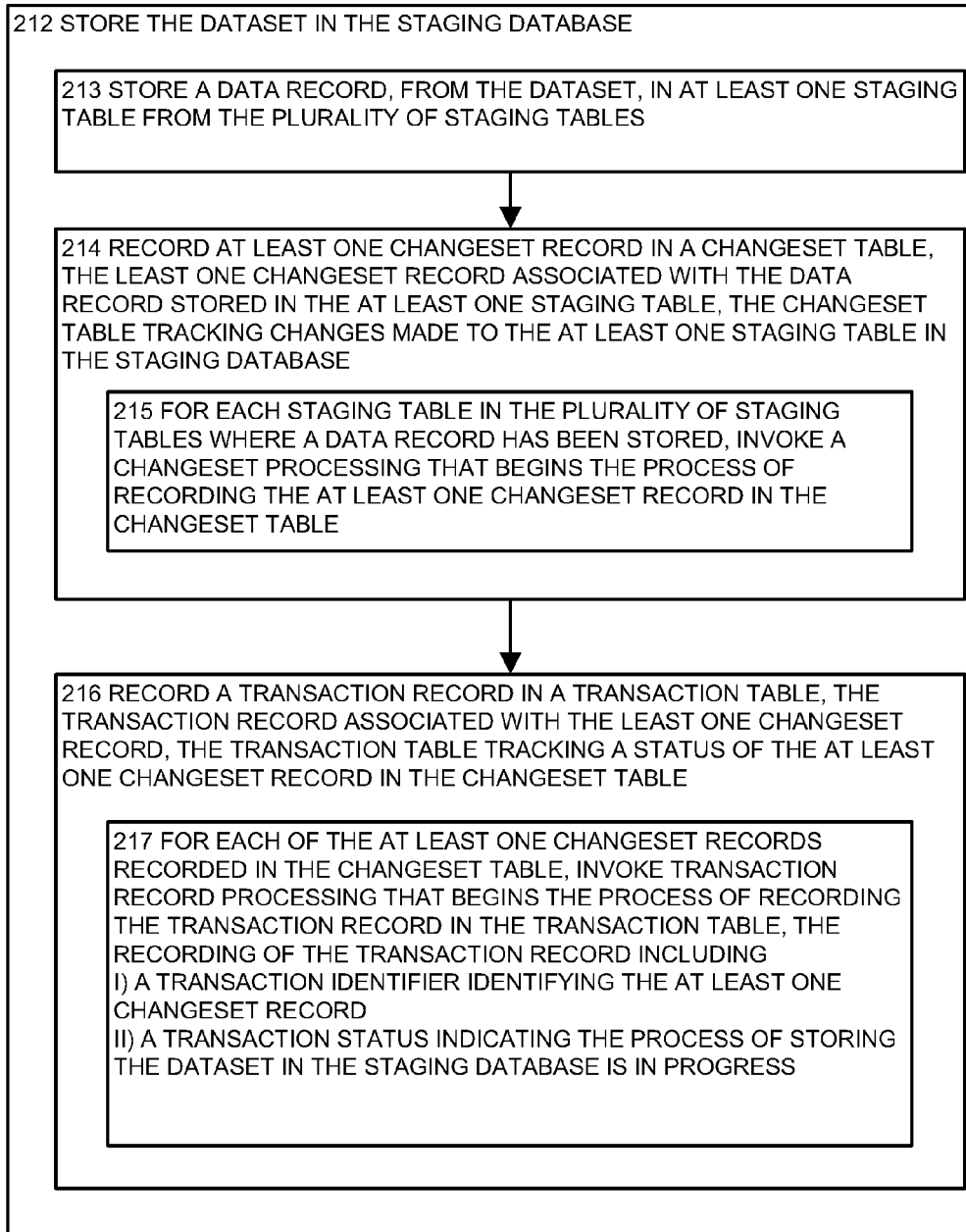
FIG. 6 illustrates a flowchart of a procedure performed by the system of FIG. 1 when the database synchronizing process stores the dataset in the staging database including storing a data record, from the dataset, in at least one staging table from the plurality of staging tables, according to one embodiment disclosed herein.

FIG. 6 is a flowchart of the steps performed by the database synchronizing process 140 when it stores the dataset 160 in the staging database 110.

In step 212, the database synchronizing process 140 stores the dataset 160 in the staging database 110. Upon successful receipt (i.e., successful execution of the commit transaction processing) of the dataset 160 transmitted from the agent 130, the dataset 160 is stored in the staging database 110.

In step 213, the database synchronizing process 140 stores a data record, from the dataset 160, in at least one staging table from the plurality of staging tables. The staging database 110 contains a plurality of staging tables. The plurality of staging tables in the staging corresponds to the tables in the production database 120 that will be modified by the insertion of the dataset 160 into the production database 120. The database synchronizing process 140 stores each data record from the dataset 160 (received from the agent 130) in the appropriate staging tables.

In step 214, the database synchronizing process 140 records at least one changeset record 144-1 in a changeset table 142. The changeset record 144-1 is associated with the data record stored in the staging tables of step 213. The changeset table 142 tracks changes made to the staging tables in the staging database 110. As each data record from the dataset 160 is inserted into staging tables, a corresponding changeset record 144-1 is inserted into the changeset table 142.

In step 215, for each staging table in the plurality of staging tables where a data record has been stored, the database synchronizing process 140 invokes a changeset processing that begins the process of recording the changeset record 144-1 in the changeset table 142. In an example embodiment, the changeset processing is a trigger that is invoked on the staging database 110. Each staging table has associated changeset trigger that records the changeset record 144-1 in the changeset table 142.

In step 216, the database synchronizing process 140 records a transaction record 148-1 in a transaction table 146. The transaction record 148-1 is associated with a corresponding changeset record 144-1 in the changeset table 142. The transaction table 146 tracks the status of the changeset record 144-1 in the changeset table 142.

In step 217, for each of the changeset records 144-1 recorded in the changeset table 142, the database synchronizing process 140 invokes transaction record processing (for example, a transaction record software process, trigger, etc) that begins the process of recording the transaction record 148-1 in the transaction table 146. The transaction record 148-1 includes a transaction identifier 152-1 identifying the changeset record 144-1, and a transaction status 154-1 that indicates the process of storing the dataset 160 in the staging database 110 is in progress.

FIG. 7 is a flowchart of the steps performed by the database synchronizing process 140 when it synchronizes the staging database 110 and the production database 120 with each other.

In step 218, the database synchronizing process 140 synchronizes the staging database 110 and the production database 120 with each other using the changeset (i.e., the changeset table 142 and the transaction table 146). As the staging database 110 receives new data from the agent 130, the staging database 110 utilizes the changeset table 142 and transaction table 146 to track the new changes in the staging database 110. The staging database 110 then synchronizes with the production database 120. As the production database 120 receives new data from, for example, the server 180, the production database 120 synchronizes with the staging database 110. During the process of storing the data from the dataset 160 in the staging database 110, the production database 120 is locked (from receiving new data).

In step 219, the database synchronizing process 140 identifies a hierarchy among the plurality of staging tables within the staging database 110. The hierarchy is defined by relationships between managed resources in a storage area network from which the dataset 160 is collected. For example, hosts in a storage area network have adapters and databases, thus the host maintains a higher position in the hierarchy than the adapters or databases.

In step 220, the database synchronizing process 140 identifies a primary key in a first staging table within the plurality of staging tables. A primary key is a key in a relational database table that uniquely defines each record in that database table. In the case of a Symmetrix system, the serial number of the Symmetrix system could be a unique identifier for a record in a table associated with Symmetrix systems.

In step 221, the database synchronizing process 140 identifies the primary key in the first staging table is a foreign key in a second staging table. A foreign key is a field in a relational database table that matches a primary key in another relational database table. Foreign keys can be used to create relationships between tables in a relational database. In an example configuration, a database table has a unique key (i.e., a primary key) that uniquely identifies every database contained within the database table. The databases in the database table may physically reside on a Symmetrix system. To link the database table with the Symmetrix table, the primary key of the database table could be a field in the Symmetrix table identifying those databases that reside on a particular Symmetrix system.

In step 222, based on a relationship of the primary key and the foreign key, the database synchronizing process 140 identifies that a second staging table maintains a higher position than the first staging table within the hierarchy among the plurality of staging tables. For example, a primary key of a database table may be a foreign key in a Symmetrix table. Therefore, the database synchronizing process 140 identifies that the Symmetrix table maintains a higher position in the hierarchy than the database table.

In step 223, the database synchronizing process 140 identifies a sequential order in which to synchronize the dataset 160 from the staging database 110 to the production database 120 based on the hierarchy. As there exists a parent child relationship between tables in a database, there is a proper order in which to add, delete and/or modify data within a relational database. In an example configuration, the agent 130 provides the database synchronizing process 140 with the sequential order in which to synchronize the dataset 160 from the staging database 110 to the production database 120.

In step 224, the database synchronizing process 140 copies the dataset 160 from the staging database 110 to the production database 120, according to the sequential order provided by the agent 130.

FIG. 8 is a flowchart of a continuation of the steps performed by the database synchronizing process 140 when it copies the dataset 160 from the staging database 110 to the production database 120 according to the sequential order.

In step 224, the database synchronizing process 140 copies the dataset 160 from the staging database 110 to the production database 120, according to the sequential order provided by the agent 130.

In step 225, the database synchronizing process 140 identifies, in the dataset 160, a data record to be deleted from the second staging table in the production database 120. During the process of inserting the dataset 160 into the staging database 110, a changeset is maintained of those changes made to the staging database 110. During the process of synchronizing the production database 120, the changeset is utilized to synchronize the production database 120 with the staging database 110. In an example configuration, a data record was deleted from the staging database 110 and the changeset indicates that a data record is to be deleted from a second staging table in the production database 120.

In step 226, the database synchronizing process 140 deletes the data record from the first staging table in the production database 120. In an example configuration, the database synchronizing process 140 identifies a hierarchy between the first staging table and a second staging table in the production database 120 whereby the first staging table is a child of the second staging table. Thus, the database synchronizing process 140 first deletes the data record from the first staging table in the production database 120.

In step 227, following the deletion of the data record from the first staging table in the production database 120, the database synchronizing process 140 deletes the data record in the second staging table in the production database. To maintain the proper hierarchy, the database synchronizing process 140 first deletes the data record in the first staging table (i.e., the 'child') in the production database 120 prior to deleting the data record in the second staging table (i.e., the 'parent'). If the second staging table were deleted prior to the first staging table, the parent child relationship between the first staging table and the second staging table would be severed, causing difficulty in maintaining the relational database.

Alternatively, in step 228, the database synchronizing process 140 identifies, in the dataset 160, a data record to be inserted into the first staging table in the production database 120. During the process of inserting the dataset 160 into the staging database 110, a changeset is maintained of those changes made to the staging database 110. During the process of synchronizing the production database 120, the changeset is utilized to synchronize the production database 120 with the staging database 110. In an example configuration, a data record was inserted into the staging database 110 and the changeset indicates that a data record is to be inserted into a second staging table in the production database 120.

In step 229, the database synchronizing process 140 inserts the data record in the second staging table in the production database 120. In an example configuration, the database synchronizing process 140 identifies a hierarchy between the first staging table and a second staging table in the production database 120 whereby the first staging table is a parent of the second staging table. Thus, the database synchronizing process 140 first inserts the data record into the first staging table in the production database 120 (i.e., the "parent").

In step 230, following the insertion of the data record in the first staging table in the production database 120, the database synchronizing process 140 inserts the data record in the second staging table in the production database 120 (i.e., the "child"). To maintain the proper hierarchy, the database synchronizing process 140 first inserts the data record into the first staging table in the production database 120 prior to inserting the data record into the second staging table. If the data record were inserted into the second staging table to the first staging table, it would be difficult to establish the primary key for the first staging table (i.e., the parent table), and maintain the proper hierarchy.

FIG. 9 is a flowchart of a continuation of the steps performed by the database synchronizing process 140 when it identifies a hierarchy among the plurality of staging tables.

In step 231, the database synchronizing process 140 identifies a hierarchy among the plurality of staging tables within the staging database 110. The hierarchy is defined by relationships between managed resources in a storage area network from which the dataset 160 is collected. For example, hosts in a storage area network have adapters and databases, thus the host is maintains a higher position in the hierarchy than the adapters or databases.

In step 232, the database synchronizing process 140 identifies a self-referencing relationship between staging tables. An example of a self-referencing relationship between tables is a first table having a primary key that is a foreign key of a second table, and the second table having a primary key that is a foreign key in a first staging table.

In step 233, the database synchronizing process 140 identifies a primary key in the first staging table is a foreign key in the second staging table.

In step 234, the database synchronizing process 140 identifies a primary key in the second staging table is a foreign key in the first staging table.

FIG. 10 is a flowchart of a continuation of the steps performed by the database synchronizing process 140 when copies the dataset 160 from the staging database 110 to the production database 120, according to the sequential order.

In step 235, the database synchronizing process 140 copies the dataset 160 from the staging database 110 to the production database 120, according to the sequential order provided by the agent 130.

In step 236, the database synchronizing process 140 identifies, in the dataset 160, a data record to be updated in the first staging table in the production database 120. In an example configuration the database synchronizing process 140 identifies a self-referencing relationship between the first staging table and a second staging table.

In step 237, the database synchronizing process 140 nullifies the foreign key in the second staging table. In other words, the foreign key in the second staging table is set to null.

In step 238, the database synchronizing process 140 nullifies the foreign key in the staging table. In other words, the foreign key in the first staging table is set to null.

In step 239, the database synchronizing process 140 updates the data record in the first staging table in the production database 120. In the dataset 160 inserted into the staging database 110, the data record was updated. During the synchronization of the production database 120 with the staging database 110, the corresponding data record in the production database 120 is updated.

In step 240, following the updating of the data record in the first staging table in the production database 120, the database synchronizing process 140, sets the foreign key in the second staging table to the primary key in the first staging table. The database synchronizing process 140 resets the nullified foreign key, in the second staging table, to point to the primary key in the first staging table.

In step 241, the database synchronizing process 140 sets the foreign key in the first staging table to a primary key in the second staging table. The database synchronizing process 140 resets the nullified foreign key, in the first staging table, to point to the primary key in the second staging table.

FIG. 11 is a flowchart of the steps performed by the database synchronizing process 140 when synchronizes the staging database 110 and the production database 120 with each other using the changeset.

In step 242, the database synchronizing process 140 synchronizes the staging database 110 and the production database 120 with each other using the changeset (i.e., the changeset table 142 and the transaction table 146). As the staging database 110 receives new data from the agent 130, the staging database 110 utilizes the changeset table 142 and transaction table 146 to track the new changes in the staging database 110. The staging database 110 then synchronizes with the production database 120. As the production database 120 receives new data from, for example, the server 180, the production database 120 synchronizes with the staging database 110. During the process of storing the data from the dataset 160 in the staging database 110, the production database 120 is locked (from receiving new data).

In step 243, the database synchronizing process 140 invokes changeset table processing that identifies at least one transaction status 154-1 associated with at least one transaction record 148-1 in a transaction table 146. The transaction record 148-1 is associated with a data record copied from the staging database 110 to the production database 120. The transaction status 154-1 indicates that the process of storing the data record in the production database 120 is in progress.

In step 244, the database synchronizing process 140 deletes at least one changeset record 144-1 in a changeset table 142. The changeset record 144-1 contains a transaction identifier 152-1, a table record identifier identifying a data record in the table in the production database 120 in which the data record was copied, a table identifier identifying the table in the production database 120 in which the data record was copied, and an action associated with the data record in the table in the production database 120, such as whether the data record was inserted, deleted and/or updated. The changeset record 144-1 is associated with the transaction record 148-1 having a transaction status 154-1. When the data record is inserted into the staging database 110, the transaction status 154-1 is set to "in progress".

In step 245, once the data record has been copied from the staging database 110 to the production database 120, the database synchronizing process 140 modifies the transaction status 154-1 to include at least one of:

i) "success" indicating a successful copying of the data record from the staging database to the production database 120; and ii) "error" indicating an unsuccessful copying of the data record from the staging database to the production database 120.

In step 246, the database synchronizing process 140 invokes transaction table processing that deletes the transaction record 148-1 having the transaction status 154-1. In an example configuration, a transaction table software process runs periodically, and deletes all the transaction records 148-N in the transaction table 146 that have a transaction status 154-1 of either 'success' or 'error'.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of synchronizing a staging database with a production database, the method comprising:

receiving a dataset for storing in a staging database, the dataset containing storage area network (SAN) management data collected from a managed resource of a SAN wherein receiving the dataset comprises;

serially receiving a plurality of partitions from an agent operating in a storage area network, each partition containing a respective portion of data for the dataset collected from the managed resource operating in the storage area network, the plurality of partitions received as partitions due to large amounts of data collected from the managed resource by the agent;

storing the dataset in the staging database wherein storing the dataset in the staging database comprises:

storing data from each partition into the staging database while the staging database is unsynchronized with the production database and the production database is in a read-only mode, and verifying success of storage of data from each partition to indicate completion of receipt of all data from the dataset;

maintaining a changeset identifying changes made to the staging database during the step of storing the dataset; and synchronizing the staging database with the production database using the changeset wherein synchronizing the staging database with the production database comprises:

determining that success from all partitions in the data has occurred indicating the an entirety of the dataset is present in the staging database prior to synchronizing the staging database with the production database wherein the production database is in a read-write mode during synchronization.

2. The method of claim 1 wherein storing the dataset in the staging database comprises:

invoking transaction processing to begin a transaction of transmitting the dataset at the staging database;

identifying that the dataset is comprised of the plurality of partitions;

for each partition within the plurality of partitions, performing the steps of:

invoking partition processing to begin transmission of the partition to the staging database;

upon successful completion of the partition processing, invoking commit partition processing to commit the partition to the staging database;

upon successful completion of the commit partition processing for each of the partitions within the plurality of partitions, invoking commit transaction processing to commit the transaction of receiving the dataset at the staging database;

detecting an error associated with the partition process;

invoking abort partition processing to terminate the partition processing; and invoking abort transaction processing to terminate the transaction processing of receiving the dataset at the staging database.

3. The method of claim 1 wherein the staging database is comprised of a plurality of staging tables and wherein storing the dataset in the staging database comprises:

storing a data record, from the dataset, in at least one staging table from the plurality of staging tables;

recording at least one changeset record in a changeset table, the at least one changeset record associated with the data record stored in the at least one staging table, the changeset table tracking changes made to the at least one staging table in the staging database; and recording a transaction record in a transaction table, the transaction record associated with the at least one changeset record, the transaction table tracking a status of the at least one changeset record in the changeset table.

4. The method of claim 3 wherein recording at least one changeset record in a changeset table comprises:

for each staging table in the plurality of staging tables where a data record has been stored, invoking a changeset processing that begins the process of recording the at least one changeset record in the changeset table.

5. The method of claim 3 wherein recording a transaction record in a transaction table comprises:

for each of the at least one changeset records recorded in the changeset table, invoking transaction record processing that begins the process of recording the transaction record in the transaction table, the recording of the transaction record including:

i) a transaction identifier identifying the at least one changeset record, and ii) a transaction status indicating the process of storing the dataset in the staging database is in progress.

6. The method of claim 1 wherein the staging database is comprised of a plurality of staging tables and wherein synchronizing the staging database with the production database using the changeset comprises:

identifying a hierarchy among the plurality of staging tables, the hierarchy defined by relationships between managed resources in a storage area network from which the dataset is collected;

identifying a sequential order in which to synchronize the dataset from the staging database to the production database based on the hierarchy; and copying the dataset from the staging database to the production database according to the sequential order.

7. The method of claim 6 wherein the plurality of staging tables includes at least one first table and at least one second table, and wherein identifying a hierarchy among the plurality of staging tables comprises:

identifying a primary key in the at least one first staging table within the plurality of staging tables;

identifying the primary key in the at least one first staging table is a foreign key in the at least one second staging table; and based on a relationship of the primary key and the foreign key, identifying that the at least one second staging table maintains a higher position than the at least one first staging table within the hierarchy among the plurality of staging tables.

8. The method of claim 7 wherein copying the dataset from the staging database to the production database according to the sequential order comprises:

identifying, in the dataset, a data record to be deleted from a second staging table in the production database;

deleting the data record from a first staging table in the production database; and following the deletion of the data record from the first staging table in the production database, deleting the data record in the second staging table in the production database.

9. The method of claim 7 wherein copying the dataset from the staging database to the production database according to the sequential order comprises:
identifying, in the dataset, a data record to be inserted into a first staging table in the production database;
inserting the data record in a second staging table in the production database; and
following the insertion of the data record in the second staging table in the production database, inserting the data record in the first staging table in the production database.

10. The method of claim 6 wherein the plurality of staging tables includes at least one first table and at least one second table, and wherein identifying a hierarchy among the plurality of staging tables comprises:
identifying a self-referencing relationship between staging tables by:
identifying a primary key in the at least one first staging table is a foreign key in the at least one second staging table; and
identifying a primary key in the at least one second staging table is a foreign key in the at least one first staging table.

11. The method of claim 10 wherein copying the dataset from the staging database to the production database according to the sequential order comprises:
identifying, in the dataset, a data record to be updated in a first staging table in the production database;
nullifying the foreign key in the at least one second staging table;
nullifying the foreign key in the at least one first staging table;
updating the data record in the first staging table in the production database;
following the updating of the data record in the first staging table in the production database, setting the foreign key in the at least one second staging table to the primary key in the at least one first staging table; and
setting the foreign key in the at least one first staging table to a primary key in the at least one second staging table.

12. The method of claim 1 wherein synchronizing the staging database with the production database using the changeset comprises:
invoking changeset table processing that identifies at least one transaction status associated with at least one transaction record in a transaction table, the at least one transaction record associated with a data record copied from the staging database to the production database, the transaction status indicating the process of storing the data record in the production database is in progress;
deleting at least one changeset record in a changeset table, the at least one changeset record associated with the at least one transaction record having a transaction status; and
modifying the transaction status to include at least one of
i. a success indicating a successful copying of the data record from the staging database to the production database; and
ii. an error indicating an unsuccessful copying of the data record from the staging database to the production database.

13. A computerized device comprising:
a memory;
a processor;
a communications interface;
an interconnection mechanism coupling the memory, the processor and the communications interface;
wherein the memory is encoded with a database synchronizing application that when executed on the processor is capable of synchronizing databases on the computerized device by performing the operations of:
receiving a dataset for storing in a staging database, the dataset containing storage area network (SAN) management data collected from a managed resource of a SAN wherein receiving the dataset comprises;
serially receiving a plurality of partitions from an agent operating in a storage area network, each partition containing a respective portion of data for the dataset collected from the managed resource operating in the storage area network, the plurality of partitions received as partitions due to large amounts of data collected from the managed resource by the agent;
storing the dataset in the staging database wherein storing the dataset in the staging database comprises:
storing data from each partition into the staging database while the staging database is unsynchronized with the production database and the production database is in a read-only mode, and verifying success of storage of data from each partition to indicate completion of receipt of all data from the dataset;
maintaining a changeset identifying changes made to the staging database during the step of storing the dataset; and
synchronizing the staging database with the production database using the changeset wherein synchronizing the staging database with the production database comprises:
determining that success from all partitions in the data has occurred indicating the an entirety of the dataset is present in the staging database prior to synchronizing the staging database with the production database wherein the production database is in a read-write mode during synchronization.

14. The computerized device of claim 13 wherein the staging database is comprised of a plurality of staging tables and wherein when the computerized device performs the operation of storing the dataset in the staging database, the computerized device is capable of performing the operation of:
storing a data record, from the dataset, in at least one staging table from the plurality of staging tables;
recording at least one changeset record in a changeset table, the at least one changeset record associated with the data record stored in the at least one staging table, the changeset table tracking changes made to the at least one staging table in the staging database; and
recording a transaction record in a transaction table, the transaction record associated with the at least one changeset record, the transaction table tracking a status of the at least one changeset record in the changeset table.

15. The computerized device of claim 14 wherein when the computerized device performs the operation of recording a transaction record in a transaction table, the computerized device is capable of performing the operation of:
for each of the at least one changeset records recorded in the changeset table, invoking transaction record processing that begins the process of recording the transaction record in the transaction table, the recording of the transaction record including:

i) a transaction identifier identifying the at least one changeset record, and ii) a transaction status indicating the process of storing the dataset in the staging database is in progress.

16. The computerized device of claim 13 wherein when the computerized device performs the operation of synchronizing the staging database with the production database using the changeset, the computerized device is capable of performing the operation of:

invoking changeset table processing that identifies at least one transaction status associated with at least one transaction record in a transaction table, the at least one transaction record associated with a data record copied from the staging database to the production database, the transaction status indicating the process of storing the data record in the production database is in progress;

deleting at least one changeset record in a changeset table, the at least one changeset record associated with the at least one transaction record having a transaction status; and modifying the transaction status to include at least one of
i) a success indicating a successful copying of the data record from the staging database to the production database; and
ii) an error indicating an unsuccessful copying of the data record from the staging database to the production database.

17. A computer program product including a computer-storage medium encoded with computer programming logic that when executed on a process in a computerized device provides database synchronization, the medium comprising:

instructions for receiving a dataset for storing in a staging database, the dataset containing storage area network (SAN) management data collected from a managed resource of a SAN wherein receiving the dataset comprises;

serially receiving a plurality of partitions from an agent operating in a storage area network, each partition containing a respective portion of data for the dataset collected from the managed resource operating in the storage area network, the plurality of partitions received as partitions due to large amounts of data collected from the managed resource by the agent;

instructions for storing the dataset in the staging database wherein storing the dataset in the staging database comprises:

storing data from each partition into the staging database while the staging database is unsynchronized with the production database and the production database is in a read-only mode, and verifying success of storage of data from each partition to indicate completion of receipt of all data from the dataset;

instructions for maintaining a changeset identifying changes made to the staging database during the step of storing the dataset; and instructions for synchronizing the staging database with the production database using the changeset wherein synchronizing the staging database with the production database comprises:

determining that success from all partitions in the data has occurred indicating the an entirety of the dataset is present in the staging database prior to synchronizing the staging database with the production database wherein the production database is in a read-write mode during synchronization.

18. The method of claim 1, wherein the staging database is comprised of a plurality of staging tables, a changeset table, and a transaction table, and wherein storing the dataset in the staging database comprises:

storing a data record, from the dataset, in at least one staging table from the plurality of staging tables;

recording at least one changeset record in the changeset table, the at least one changeset record associated with the data record stored in the at least one staging table, the changeset table tracking changes made to the at least one staging table in the staging database; and recording a transaction record in the transaction table, the transaction record associated with the at least one changeset record, the transaction table tracking a status of the at least one changeset record in the changeset table;

and wherein synchronizing the staging database to the production database using the changeset comprises:

identifying a hierarchy among the plurality of staging tables, the hierarchy defined by relationships between managed resources in a storage area network from which the dataset is collected;

identifying a sequential order in which to synchronize the dataset from the staging database to the production database based on the hierarchy; and invoking changeset table processing that identifies at least one transaction status associated with at least one transaction record in a transaction table, the at least one transaction record associated with a data record copied from the staging database to the production database, the transaction status indicating the process of storing the data record in the production database is in progress;

copying the dataset from the staging database to the production database according to the sequential order;

deleting at least one changeset record in a changeset table, the at least one changeset record associated with the at least one transaction record having a transaction status; and modifying the transaction status.

19. The method of claim 18, comprising:

periodically deleting records in the transaction table that have a success status indicating a successful copying of the data record from the staging database to the production database; and periodically deleting records in the transaction table that have an error status indicating an unsuccessful copying of the data record from the staging database to the production database.

* * * * *